Dec. 29, 1959   J. M. N. HANLET ET AL   2,919,402
METHOD AND MEANS FOR MEASURING THE FREQUENCY
OF AN ELECTRICAL OSCILLATION
Filed Jan. 8, 1957

Inventors
Jacques M. N. Hanlet
Jean Heinisch
Roger Loyen
By Ralph B. Stewart
attorney

United States Patent Office 2,919,402
Patented Dec. 29, 1959

2,919,402

METHOD AND MEANS FOR MEASURING THE FREQUENCY OF AN ELECTRICAL OSCILLATION

Jacques Marie Nöel Hanlet, Paris, Jean Heinisch, Gagny, and Roger Loyen, Paris, France, assignors to CEDEL, Centre d'Etudes et de Développements de l'Electronique, Paris, France Application January 8, 1957, Serial No. 633,064

Claims priority, application France January 14, 1956

7 Claims. (Cl. 324—78)

The present invention relates to an arrangement for measuring the frequency of an electrical oscillation forming an information signal wherein part of the carried information is constituted by the said frequency which varies according to the value of the said information within predetermined higher and lower limits.

An object of the invention is to provide a frequency measurement system and method which ensures highly accurate and faithful results through the use of very simple means therefor. The invention will be most useful when applied to remote control, metering, display and indication systems wherein the information signals are made of damped oscillation pulse trains, whether or not of a uniform rhythm of transmission.

The method for measuring the frequency of an electrical oscillation according to the invention relates to a general scheme which includes the counting of pulses derived from the oscillation proper, and is mainly characterized in that it provides the step of deriving from the incoming oscillations such pulses as determined by the alternations of a definite polarity therein, counting the said pulses and, after a predetermined number of the counted pulses, generating a first and a second electrical signal, the said first signal having such a duration as it would be useful for completely ending the count if the frequency of the incoming oscillation were at its higher value, and the other and second signal being of a duration enabling the effective count of the incoming pulses until this very same number of pulses are counted, and then measuring the difference of the durations of the said first and second signals.

The use of such a method will, in most cases, involve an initial change of frequency of the incoming oscillations, as the lower the frequency of the counted pulses the higher the safety of operation of the said method.

It is further provided, from the method as stated, to substantially eliminate from any count the first of the incoming pulses. This is of advantage since in signals comprising damped oscillation pulse trains, the transients are predominant during the beginning of each damped oscillation as well during the propagation thereof in the transmission medium before it reaches the receiving point as in the input circuits of the said receiver point. Actually, the measure of frequency according to the invention will only concern that part of any damped oscillation which can be considered as a "pure" oscillation.

The invention will be ascertained with reference to that kind of signals which have been described in co-pending application No. 593,732, filed June 25, 1956, in the name of one of the inventors, Mr. Hanlet. In such a case, the informations signals were obtained by shock-activation of a plurality of damped oscillating circuits, each one being tuned to a distinct basic frequency and each one being placed under the control of a separate physical parameter. The elementary signals were then mixed for the modulation thereby of a continuous carrier wave.

Qualitatively, each one of the signals, before the mixing thereof, was such as shown in Fig. 1 of the accompanying drawing. The frequency of the shock-activations has a recurrency time period $\theta$ and the damping is such, in any case, that at the end of each $\theta$ period, there exists a time interval T during which the damped oscillation may be considered as unexisting.

Figure 1:
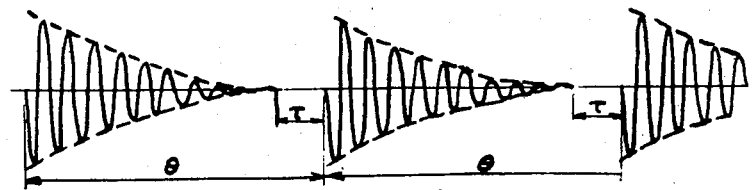
Figure 2:
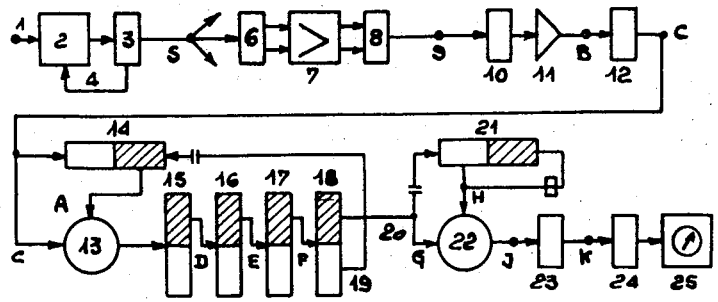
Fig. 2 shows part of a receiver for such signals, with the inclusion therein of a frequency measuring system according to the invention.

An incoming signal constituted by a mixture of several signals such as the one shown in Fig. 1, each having a distinct damped oscillation frequency, enters the receiver 2 at 1 in Fig. 2. This receiver is of any suitable conventional kind and the output thereof includes a wide band frequency discriminator circuit 3. A feedback coupling from the said frequency discriminator to the receiver is shown at 4, for an automatic frequency control of a conventional type. The segregation of the several oscillations in the received signal is made at 5 at the output of the said frequency discriminator. The invention is applied to any and all of the separate branches therefrom, one of which only is fully disclosed in the drawing.

At the said point 5 and at each $\theta$ period, there exists several damped oscillation trains having separate basic frequencies. The "basic frequency" will for instance be defined as being the higher possible frequency of any sinusoidal damped oscillation corresponding to a definite information. This information may, in any and all channels, be represented by a frequency shift remaining within frequency limits of a relative ratio of, say, 1/.8.

The waveform appearing at point 5 is applied therefrom to a coupling circuit 6 of the asymmetrical-to-symmetrical kind, the output of which feeds a symmetrical amplifier 7, of frequency selective characteristic of transfer, so that at the output of the said amplifier, and through a coupling circuit of the symmetrical-to-asymmetrical kind 8, the information signal will only preserve a waveform of the shape shown in Fig. 1 corresponding to only one of the informations to be measured and/or indicated. It is from the output 9 of the said segregation and amplification part of the receiver that the invention proper is embodied. It must be noticed that no complicated filtering has been required before this point of operation, and no need of restoring or preservation of the D.C. component of the incoming signal has been encountered.

At 10 the incoming waveform (see Fig. 1) is clipped for delivering a quasi-rectangular waveform which is amplified at 11. At the output point B of the said amplifier 11, the resulting waveform is such as shown in the graph B of Fig. 3. This signal is applied to a pulse trigger circuit 12, the output waveform of which is shown in the graph C of Fig. 3.

Of course, the clipping could have been provided within the amplifier 7 through establishment of suitable thresholds in the said amplifier circuit.

Figure 3:
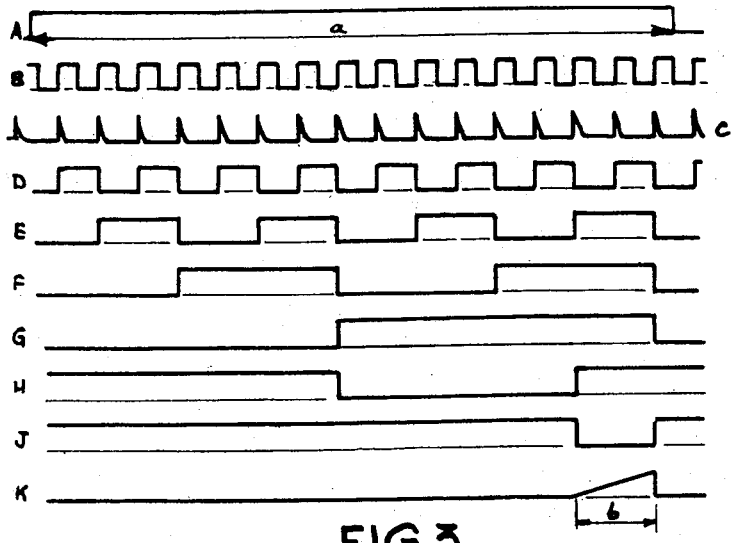
Fig. 3 shows signal graphs for the explanation of the operation of the said system; and, Fig. 4 shows an additional circuit which may advantageously be inserted in the system of Fig. 2 for a purpose which will be further explained.

The duration in time of the signal C covers most parts of one damped oscillation train. With the method of measurement according to the invention, only a small number of these pulses C will be necessary according to a predetermination of the count of a binary counter to which are applied these pulses C. In the illustrated embodiment, the said binary counter comprises four bistable stages 15 to 18. It is assumed that the counter is actuated by negative pulses and the rest condition is shown in Fig. 2 for such a case. The graphs D, E, F, and G of Fig. 3 show the respective waveforms issuing from the said trigger bistable stages 15 to 18, as seen from the plate outputs of the tubes in the said stages which are conducting in the individual zero condition thereof.

The pulses C are permitted to reach the input of the counting chain when a gate 13 is open. This gate is controlled from a bistable stage 14 which is activated by the first one of the C pulses, and brings the gate 13 to a transfer condition for the further C pulses, and is reset from the output 19 of the binary counter stage 18. The gate control signal for gate 13 is shown at A in Fig. 3, and lasts a time interval equal to the time useful for counting sixteen pulses C in the said binary counter (actual time). It may be noted that the first C pulse at least cannot pass through the gate 13. Instead of a bistable stage 14, it would have been possible to provide a monostable or one-shot flip-flop circuit actuated from the output pulse at 19 from the last stage of the binary counter, and resetting with a time interval such that it would have been reset during the period T between the actual pulse trains, see Fig. 1. The gate 13 would have been conducting in the reset condition of the said one-shot flip-flop circuit.

As said in the beginning of the specification, it is in the beginning part of any damped oscillation at point 9 that transients and stray signals may exist. The count will possibly be erroneous when counting the first C pulses. This will be avoided by ensuring a delay of operation of the stage 14 in response to the first C pulse appearing at point C. Either a short delay element is inserted between the said point C and the actuation input of 14 or the said stage 14 may be the second or third of a trigger cascade actuated from the said point C.

Referring back to the shown example, after the eighth pulse incoming at C the output 20 of the binary counter will deliver a positive pulse, as this stage triggers to its work condition, at terminal 20. From this instant further, the D.C. voltage on the lead 20 will remain high until the counter has received eight further pulses at the input thereof, viz. until the overall count reaches sixteen.

The said first positive pulse at 20 is used for triggering a constant duration signal, and the D.C. output voltage is used for generating a variable duration signal for the measuring of the information frequency according to the method provided in the present invention.

The constant duration signal is generated by the one-shot or monostable trigger stage 21, actuated to the work condition by the above defined pulse at 20. It generates a waveform shown at H in the graphs of Fig. 3. This waveform controls the gate 22 which receives the D.C. voltage from the same lead 20, waveform G.

The output signal waveform from the gate 22 is shown at J. It presents a lower voltage portion during a time interval equal to the difference between the higher voltage portion of G and that part of H which is at the lower voltage thereof. The time interval occupied by the higher voltage part of G corresponds to the actual count of eight pulses C by the binary counter. The length in time of the signal H, triggerred as said, determines a reference as it is adjusted for corresponding to the count of eight incoming pulses C when the damped oscillation from which these pulses are derived is at its lowest frequency value. Consequently, the measurement of the lower voltage part of J will give a measurement of the said frequency of damped oscillations. It would have been quite possible, of course, to take the reference in another fashion, and for instance corresponding to the highest frequency to be measured. The parts played by G and H in the shown circuit would have been merely reversed with respect to the gate 22. Of course, it will always be possible to take 22 as a true coincidence circuit in the "logical" meaning of this term, so that the signals G and H may be of similar directions and play reciprocal parts in the actuation of the said gate 22.

The measurement signal J may be now used as follows: applied to an integrating circuit 23, it gives the waveform shown as K in the graphs of Fig. 3. The peak value of the so-obtained single saw-tooth can be metered from a peak voltmeter 24 and displayed on a needle indicator 25. The integration of J during a time interval "b," ensures a maximum amplitude of the integrated voltage which is proportional to the duration of the said signal J, as known per se. Of course, J can also be used for a gating arrangement of high frequency pulses, the count of which will then lead to a digital display of the required frequency value.

Figure 4:
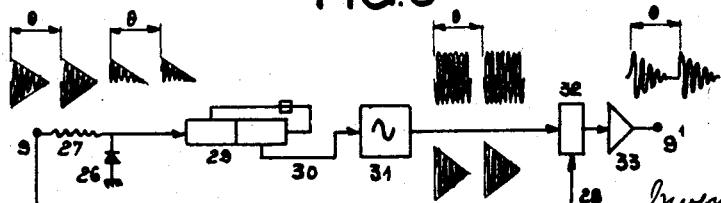

A substantial improvement in efficiency of the above described arrangement may be obtained by inserting therein an auxiliary arrangement such as disclosed in Fig. 4, at the point 9 of the circuit of Fig. 2. That part of the circuit between 5 and 9 in Fig. 2 can then be omitted. In such a case, the waveform at 9 includes high stray or parasitic components. According to the arrangement of Fig. 4, these are applied to a frequency changer 32 and on the other part, the same signals are clipped by the diode 26 and applied to a monostable or one-shot flip-flop stage 29 through a series resistor 27. The value of 27 is quite high so that the point 9 is isolated from the input of the flip-flop and the said diode acts independently of the channel leading to the frequency changer 32 for the incoming signals at 9. The time interval of return to normal of the flip-flop 32 is adjusted to $\theta$—T, according to the references shown in Fig. 1. In the output lead from the said flip-flop 30, appears a rectangular wave-form or, better said, a square wave-form, of asymmetrical alternations. During the higher voltage alternations of this wave-form, a carrier oscillation is generated from a blocking oscillator 31. The output of the said oscillator consists of a series of sine wave trains which are applied to the frequency changer 32 together with the incoming damped trains at 28. The oscillating frequency of the oscillator 31 is so chosen as to be slightly lower than the lowest frequency which may exist in the damped oscillation trains. From 32 then issues a waveform such as shown after its amplification at 33, which is much purer waveform than was obtained at 9 with the scheme of Fig. 2. The output terminal $9^1$ of Fig. 4 is then connected to the input of 10 in the scheme of Fig. 2.

Not only with the use of the additional means of Fig. 4 an easier selection is ensured, but as the stability of reception is increased, the frequency span alloted to each component signal in the composite input wave may be made higher without any drawback with respect to the accuracy of the measurement.

When, for instance, the minimum frequency for the concerned signals is 20 kc./s., the frequency of the oscillator 31 may be made equal to 19 kc./s.

Of course, the two signals enabling the measurement of a frequency and which are described as being of a constant amplitude, see graphs G and H, may be made of another kind of waveform: for instance the output pulse at 20 may trigger the generations of a pair of waveforms having a saw-tooth shape, of identical slopes but of reverse polarities or directions, one of these saw-teeth being stepped a predetermined interval after the triggering thereof, the other one being stopped from the reset of the stage 18 in the binary counter. A voltage subtracting circuit will then deliver the waveform K. In a further alternative, the pulse which triggers 18 to work may also trigger on a source of pulses of a frequency corresponding to one of the frequency limits of the span to be measured, and further apply the incoming pulses C to one input of an algebraic accumulator or counter the other input of which receives the said frequency reference pulses. The numerical value of the algebraic count, at the reset of the stage 18, will give a digital measurement of the actual frequency of the incoming signal.

We claim:

1. In combination a damped oscillation signal receiver, means for converting any damped oscillation received therethrough into a series of pulses, a counter for these pulses, of predetermined capacity of count, means for marking the passing of the count to a predetermined value lower than the said capacity value of count, and means for generating from the said marking means a pair of signals one of which represents a predetermined remaining count and the other of which represents the remaining actual count, as seen from the time intervals useful for the one and the other of these counts, and means for deriving from the comparison of the said first and second signals a measure of the frequency of the said incoming damped oscillations.

2. A combination according to claim 1 and wherein the said converting means consists of clipping means for the said damped oscillation.

3. A combination according to claim 1 and wherein the said pair of signals generating means comprises on the one hand a flip-flop stage and on the other hand a gating circuit controlled from the said flip-flop stage, the output of the said gating circuit actuating an integrating circuit for the analogue formation of the said difference signal.

4. A combination according to claim 1 and wherein the said means for generating the said pair of signals includes the pair of generators of saw-toothed voltages of opposite direction, and the said means for deriving therefrom a difference signal comprises an analogue subtracting circuit supplied from the outputs of the said saw-toothed wave generators.

5. A combination according to claim 1 and wherein the means for generating the said pair of signals comprises at least one generator of pulses the output of which constitutes one of the said signals, and the other signal comprises a gating voltage controlling said counter of the said series of pulses.

6. A data processing device for informations available as frequency fluctuations of damped wave oscillations which includes in combination a receiver, means for segregating the mixed damped oscillation between separate channels, means in each one of the said channels for consecutively counting pulses derived from the said oscillations up to a predetermined count and means for generating at a predetermined value of the said count a pair of signals, one of which has a duration proportional to the remaining part of the count and the other of which has a reference duration, and means for deriving from the difference of duration of the said first and second signals, a displayable value of the frequency of the concerned damped wave oscillations.

7. A combination according to claim 1 and wherein the means for generating the said pair of signals comprises at least one generator of pulses the output of which constitutes one of the said signals, and the other signal comprises a separate series of pulses combined in opposing relation with the series of pulses forming said one signal.

References Cited in the file of this patent

UNITED STATES PATENTS

| | | |
|---|---|---|
| 2,405,597 | Miller | Aug. 13, 1946 |

FOREIGN PATENTS

| | | |
|---|---|---|
| 633,025 | Great Britain | May 11, 1949 |
| 488,605 | Canada | Dec. 2, 1952 |
| 736,637 | Great Britain | Sept. 14, 1955 |

OTHER REFERENCES

Physical Review, vol. 57, 1940, pgs. 243, 244.

"Electronic Counters," article in RCA Review, September, 1946, vol. VII, No. 13, pgs. 438, 477.

"Predetermined Counters," article in Electronics, March, 1947, pages 120–123.

"Measuring a Varying Frequency," article in Electronics, March, 1950, pages 110–112.